Figure 1:
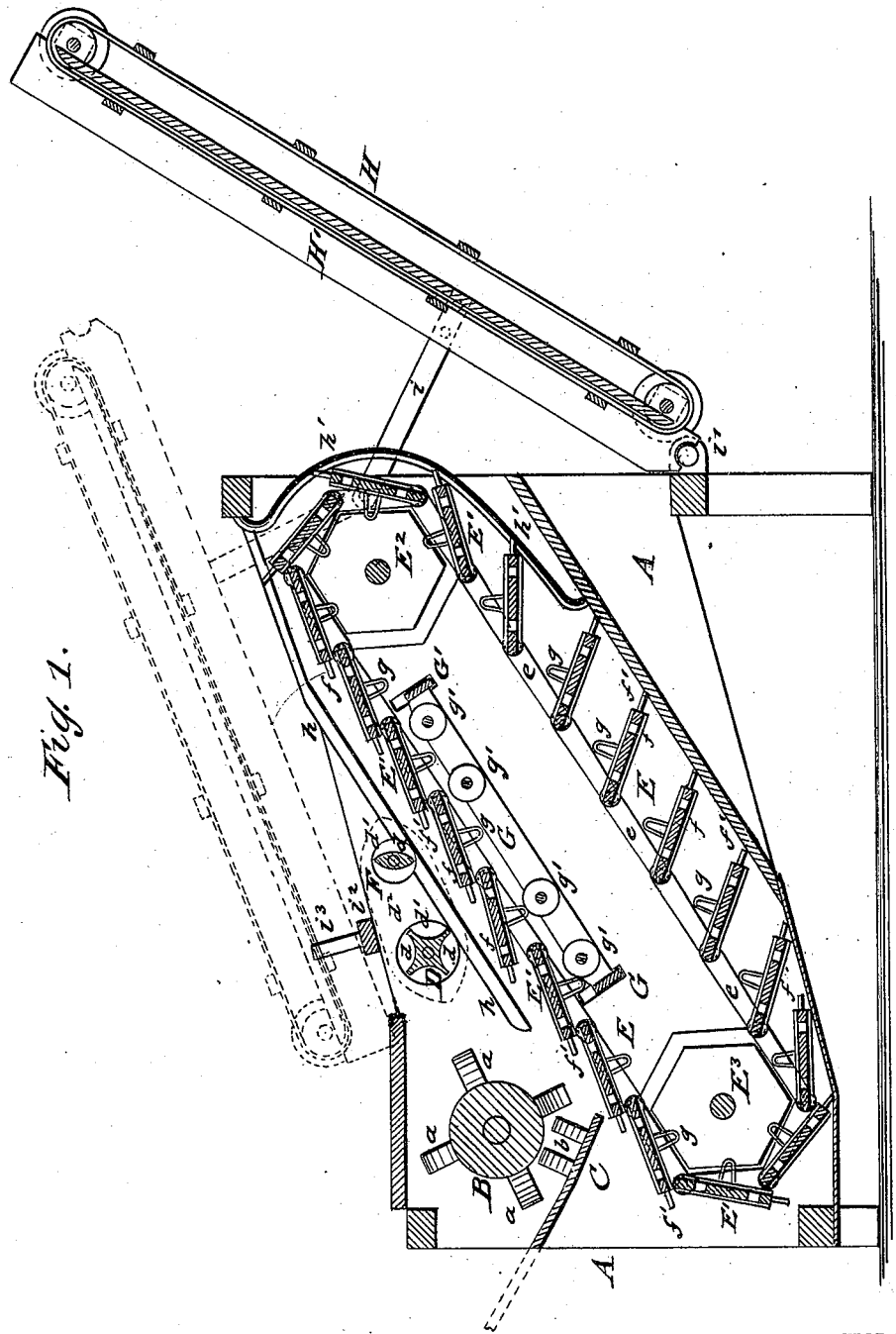

2 Sheets—Sheet 1.

J. P. & J. W. GORDON.

THRASHING-MACHINES.

No. 193,866. Patented Aug. 7, 1877.

WITNESSES:
E. Wolff
J. H. Scarborough

INVENTORS
J. P. Gordon
J. W. Gordon
BY
ATTORNEYS.

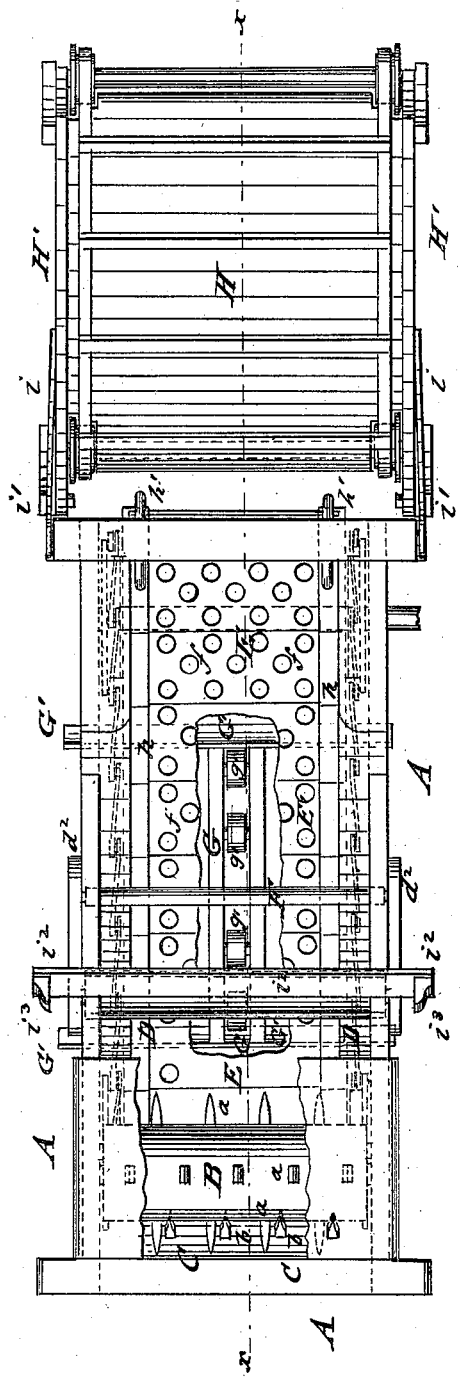

UNITED STATES PATENT OFFICE.

JAMES P. GORDON AND JOHN W. GORDON, OF COAL VALLEY, ILLINOIS.

IMPROVEMENT IN THRASHING-MACHINES.

Specification forming part of Letters Patent No. 193,866, dated August 7, 1877; application filed February 26, 1877.

*To all whom it may concern:*

Be it known that we, JAMES P. GORDON and JOHN W. GORDON, of Coal Valley, in the county of Rock Island and State of Illinois, have invented a new and Improved Grain Thrasher and Separator, of which the following is a specification:

In the accompanying drawings, Figure 1 represents a vertical longitudinal section of our improved grain thrasher and separator taken on line $x$ $x$, Fig. 2; and Fig. 2 is a plan view of the same, with parts broken off.

Similar letters of reference indicate corresponding parts.

This invention relates to an improved grain thrasher and separator, to which the sheaves are fed for thrashing and separating the grain, and by which the straw is carried off in quick and effective manner, the straw-stacker being supported in convenient manner on the separator; and the invention consists of a revolving cylinder with convex thrashing teeth, taking up and separating the grain from the straw, in connection with a fixed piece with concaved teeth.

Back of the thrashing-cylinder is a slowly-revolving beater or regulator, and back of the regulator a more rapidly-revolving "flipper," which conduct the straw and grain forward, and separate them from each other in connection with an endless carrier with intermittently-tilting and link-connected sections, having wire rake-teeth and drop-holes.

An endless stacker is hinged to the end of the separator, and placed in upright position on supports for stacking, but swung over to the top of the separator after use.

In the drawing, A represents the supporting-frame of our improved grain thrasher and separator, to which the sheaves are supplied at one end, where they are taken up by a revolving thrashing-cylinder, B, that works in connection with a fixed part, C.

The thrashing-cylinder B is provided with rows of alternating teeth $a$, that are convexed at the sides and brought to an edge, or nearly so, at the outer end, so that the teeth will pass down through the straw or sheaf and draw the same through between the teeth of a concave, C. The concave teeth $b$ are placed intermediately to the teeth of the cylinder, and arranged in two alternating rows.

The concave teeth $b$ present less resistance to the passage of the straw than the convex cylinder-teeth which act on the heads or ears and thrash the grain out while the straw is passed through without being cut or broken into short pieces. There being no short pieces of straw, the grain is more easily cleaned, as the work of fans and riddles is facilitated.

The convex cylinder-teeth and fixed concave teeth are more durable than the ordinary teeth, as they do not stick on the straw, but pass through, exerting a sharper stroke and thrashing more rapidly than the common tapering teeth.

By thinning the teeth of the concave and thickening those of the cylinder, the striking-surface of the latter is increased, while the resisting-surface of the former is diminished. The space being thus enlarged for the material to pass through the concave, a greater quantity of straw may be passed through in a given time.

The concave C may be so attached to the separator-frame A that it may be lowered or raised, and thereby the distance between the sides of the teeth enlarged or decreased. The main advantage of the convex and concave teeth is that they thrash out the grain and draw the straw through without cutting up the same.

Back of the thrashing-cylinder B is arranged a beater or regulator, D, that is intended to retard the motion of the grain and straw imparted thereto by the cylinder, the regulator revolving at about the same speed as the endless carrier E, arranged in inclined position in frame A.

The regulator and carrier move together in the nature of rolls, wedging the straw between them, and holding onto it while the stirrer or flipper F, that moves with accelerated motion, acts on the straw. The stirrer or flipper F is arranged back of the regulator, and turns in opposite direction to the regulator, so as to loosen the straw, and let the grain fall out of the same.

The regulator D and flipper F are made with circular heads $d$, a little larger than the circle described by them, the heads turning in openings $d^1$ of corresponding size in the side walls of the separator-frame, so that regulator and beater are equal in length to the width of the separator.

The journals of regulator and flipper are placed into covering cap-plates $d^2$, at the outside of frame A, to prevent, in connection with the heads, the wrapping of the straw around the journals, especially when the straw is long and wet, and keep up the regular working of the machine. The regulator and flipper retard the straw and loosen it, so that the endless carrier may do its work more perfectly.

The endless carrier E is composed of a number of tilting-sections, $E^1$, that are connected by end pivots to links $e$, forming endless chains at both sides of the sections.

The carrier E is moved by a hexagonal driving-roller, $E^2$, at one end, and a hexagonal stretching-roller, $E^3$, at the other end of frame A. Each section $E^1$ is provided with a number of perforations, $f$, for the dropping of the grain, and wire rake-teeth $f'$, extending from the end. The teeth $f'$ of adjoining sections alternate with each other, so that the straw is more effectively taken hold of and carried upward by the sections.

At the under side of each section $E^1$ is arranged a projection or roller, $g$, that is engaged successively by a number of pulleys or teeth, $g'$, of a movable frame, G, for the purpose of imparting a tilting motion to the sections.

The frame G is supported on cross-pieces $G'$, which may be raised or lowered from the outside of frame A, and thereby the tilt or shake of the sections or gates increased or decreased, according to the condition and kind of grain to be separated. Lighter grain, oats, &c., require, for instance, a heavier shake than heavier grain.

The pulleys or teeth $g'$ of frame G are placed at such distance from each other that while one-half of the sections is thrown up the other half is down, thereby giving a more even motion to the straw. This is accomplished in simple manner by making the space between the upper and lower halves of the pulleys twice as large as the distance between the pulleys themselves. The endless carrier runs light and quick, without shaking or jarring, separating, by the tilting of the sections, the grain rapidly from the straw, and keeping the short straw out of the chaff, so as to make it easier to clean the grain.

The ends of the tilting sections $E^1$ are strengthened by metal lining, and prevented from being raised too far by side rails $h$, while curved guide-rails $h'$ facilitate the turning of the sections when passing around the upper driving-roller to the inclined bottom of frame A. The sections drop or slide along the bottom, and are taken up again by the lower roller, and conducted toward the regulator, one section resting then, as before, on or lapping over the adjoining section, as shown in Fig. 1.

The straw is conducted, by the section of the endless carrier E, in upward direction, and over the highest point of the same, to be dropped on, and be taken up by, the endless stacker H, that is revolved by belt-and-pulley connection or gearing with the power-transmitting parts of the separator. The grain is dropped through the holes of the tilting sections onto the inclined bottom of the frame, and conducted to a suitable receptacle below for being finally cleaned and graded.

The stacker H is hinged to frame A by lever-arms $i$, that are rigidly attached to the frame $H'$ of the stacker, and pivoted to frame A, being supported in upwardly-inclined position for carrying off the straw on brackets $i^1$ of frame A, and when swung by means of the lever-arms $i$ over on the top of the separator on a lateral bolster, $i^2$, with upright end standards $i^3$. In this position the separator may be readily carried with the stacker from place to place, so as to save the time and labor in removing, transporting, and reattaching the stacker, and dispenses with the hinges or joints to connect the parts, and also with the mechanical appliances for raising and lowering the stacker.

The stacker is constructed of endless belts with lateral cross-strips, in the customary manner, the novelty consisting in the convenient connection of separator and stacker, that admits the storing away of the stacker on the separator and the ready swinging down of the same for work.

What we claim as new is—

1. An improved grain-separator, consisting of a revolving beater, revolving stirrer, and endless carrier with tilting sections, as shown and described.

2. The revolving thrashing-cylinder B, having tapering teeth with convex sides, in combination with an adjustable part, C, having intermediate concave teeth, substantially for the purpose described.

3. The combination, with tilting carrier-sections, of curved end guide-pieces $h'$, substantially as and for the purpose specified.

4. The combination of frame A, having bearings $i^1$, and the swinging stacker, connected with said frame by arms $i$, in the manner and for the purpose set forth.

JAMES P. GORDON.
JOHN W. GORDON.

Witnesses:
R. D. McCREERY,
A. M. BLOMQUIST,
E. L. HATCH,
S. H. GORDON.